United States Patent [19]

Tourney

[11] Patent Number: 4,935,991
[45] Date of Patent: Jun. 26, 1990

[54] FISH CLEANING STATION AND METHOD OF USING THE SAME

[76] Inventor: Wayne Tourney, 730 N. Nebraska Ave., Minden, Nebr. 68959

[21] Appl. No.: 282,742

[22] Filed: Dec. 9, 1988

[51] Int. Cl.$^5$ .......................... A22B 3/08; A22C 21/04
[52] U.S. Cl. .......................................... 17/53; 17/65; 4/629
[58] Field of Search ................. 17/53, 51, 58, 65, 1 R; 30/41.5; 241/38, 46 A, 100.5; 4/629

[56] References Cited

U.S. PATENT DOCUMENTS

| | | | |
|---|---|---|---|
| 2,753,571 | 7/1956 | Draper | 4/629 |
| 3,038,172 | 6/1962 | Fritz et al. | 4/629 |
| 3,165,779 | 1/1965 | Teetor et al. | 17/65 |
| 4,135,258 | 1/1979 | Braga et al. | 4/629 |
| 4,454,628 | 6/1984 | Olson | 17/65 |

Primary Examiner—Willis Little
Attorney, Agent, or Firm—Bernard L. Kleinke; William Patrick Waters; Jerry R. Potts

[57] ABSTRACT

The new and improved fish cleaning station includes a heavy duty stainless steel top with a durable metal base to make the facility nearly indestructible. Attached to the table are two heavy spray nozzles with steel braided hoses for providing a convenient source of water to clean the fish and table cleaning surface areas. A special area within the table provides a convenient station access for handicapped persons. The fish cleaning station also includes a centrally located garbage disposal unit adapted with a silver guard and back splash ring.

10 Claims, 1 Drawing Sheet

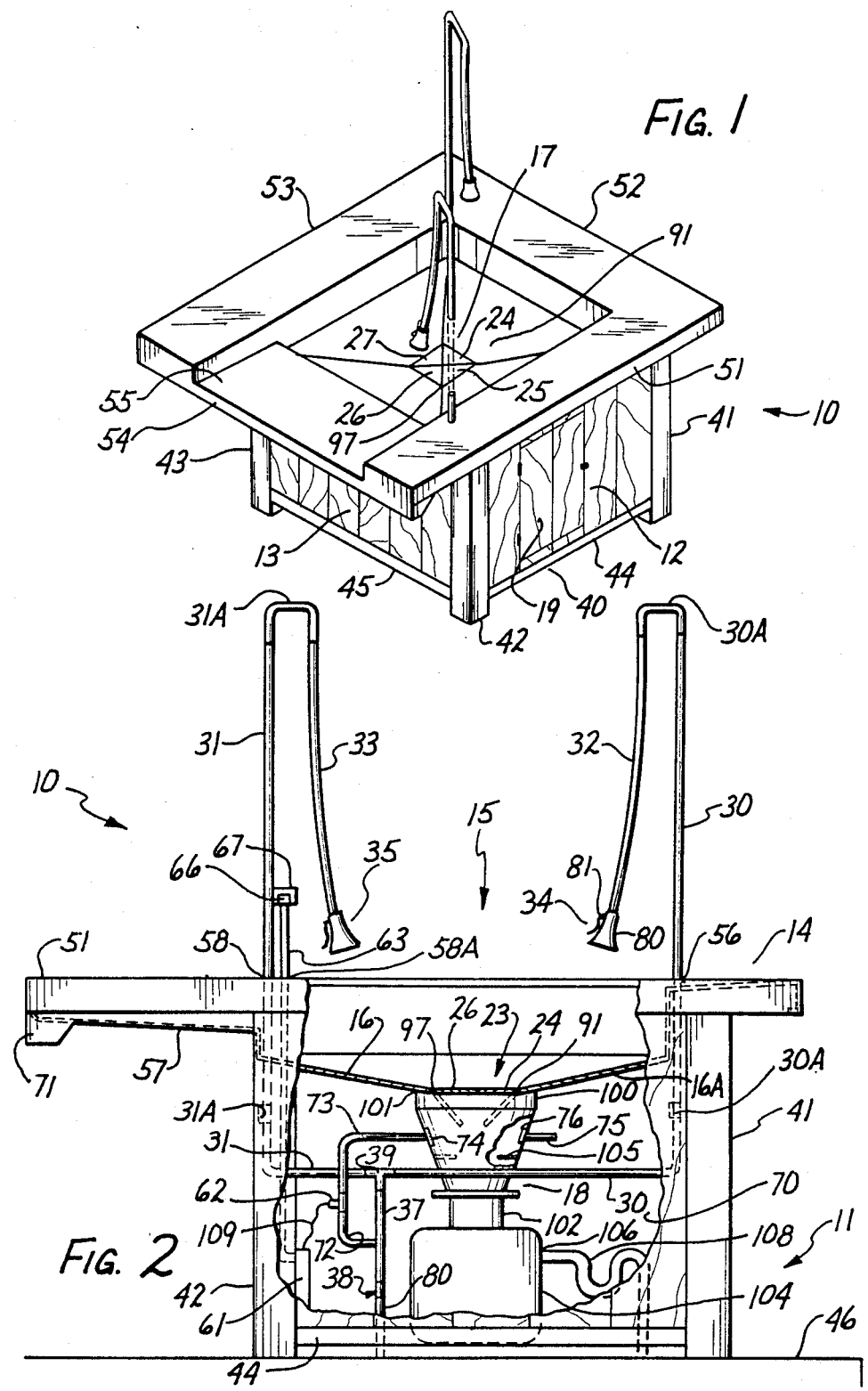

FISH CLEANING STATION AND METHOD OF USING THE SAME

TECHNICAL FIELD

This invention relates to the general field of meat cleaning tables, and a method for using them. More particularly, the present invention relates to a fish cleaning station and a method of using the cleaning of fish in a more effective and efficient manner.

BACKGROUND ART

Meat cleaning tables of various types and kinds have been known in the art. Typically, such tables include a cutting top supported by a series of legs. Such an apparatus, however, has been less than desirable for some applications, because when used in recreational areas, the disposing of fish waste material such as fish heads and the like, has not been very convenient and sanitary. Also, undesired and unwanted odors have also been a problem. Also, flies and other undesired insects and pests are attracted by accumulated waste products.

Attempts have been made in the past to overcome the problems associated with such disposal and accumulation of odors. For example, reference may be made to the following U.S. Pat. Nos.: 692,866; 2,222,767; 2,506,352; and 4,454,628.

While such prior known fish cleaning tables and the like, and methods of using them, may have been successful for some applications, such devices have had certain inadequacies and disadvantages for public use. In this regard, for example, U.S. Pat. No. 692,866 discloses a fish cleaning station in which a pair of table tops or cutting blocks are separated by a receptacle in which fish or the like, are to be temporarily placed for cleaning purposes. Disposed beneath each table top is an inclined trough which extends downwardly from one peripheral edge of the top to the opposite end of the top. A series of spaced apart opened chutes are disposed outside of the top for receiving the fish heads and waste that falls by the force of gravity into the inclined trough. A stream of water introduced into the trough carries the fish waste down the trough into a disposal bucket. In such a system, waste material would tend to build up on the tops and chutes of the cleaning station to create undesirable and unwanted odors, thus, undesirable and frequent cleaning of the station is required by park personnel. Moreover, the removal of waste materials is required periodically by park personnel, or others. Such frequent attention is costly, and certainly an unwanted and undesirable task.

As another attempted solution, U.S. Pat. No. 4,454,628 discloses a fish cleaning table attached or suspended from a sink having a drain and faucet. The table includes a series of slats, and a water spraying system, connected to the faucet, permits water under pressure to be directed onto the slats on a continuous basis, to wash the fish waste and debris down between the slats and into the drain. Since the system is portable, it is not adaptable for use by the public, since it could be easily removed or broken by vandalism. Moreover, unwanted fish waste materials are collected in a strain and must be removed from the fish cleaning station area periodically.

Therefore, it would be highly desirable to have a permanent fish cleaning station, which is designed to be used by the public, and which facilitates the removal of fish debris and is adapted to be maintained in a generally sanitary manner conveniently. Such a station should not tend to collect undesired and unwanted odors.

With the enactment of certain federal and state statutes, it has become normal practice for public facilities to require that they be easily and conveniently utilized by handicapped persons. Prior known fish cleaning stations, however, have not been designed to accommodate handicapped persons, particularly those confined to a wheelchair or the like.

Therefore, it would be highly desirable to have a fish cleaning station, which is adapted for public use, and which is sturdy in construction so as to be used by the public, without being easily susceptible to vandalism damage. Such a station should be easily and conveniently utilized by handicapped persons, particularly those confined to a wheel chair.

DISCLOSURE OF INVENTION

Therefore, it is the principal object of the present invention to provide a new and improved fish cleaning station and method of using it, to permit fish to be cleaned in a convenient and efficient manner.

Another object of the current invention is to provide a new and improved fish cleaning station, which can be installed in various public locations, such as parks, in a convenient manner, and which can facilitate fish cleaning operations, while reducing unwanted odors and the undesirable accumulation of fish waste and debris that might otherwise attract undesired and unwanted flies, ants, and other insects and pests.

Another object of the current invention is to provide a new and improved fish cleaning station, which is adapted for public use, and which may also be easily and conveniently used conveniently as well by handicapped persons, particularly those confined to a wheelchair.

Briefly, the above and further objects of the present invention are realized by providing a fish cleaning station, as well as a method of using it, for allowing fish to be easily and conveniently cleaned.

The fish cleaning station includes a heavy duty stainless steel top or table with a durable metal base to make the facility nearly indestructible. Attached to the table are two heavy spray nozzles with steel braided hoses for providing a convenient source of water under pressure to clean the fish, as well as fish cleaning basin and table cleaning surfaces and areas, thereby helping to control odors. A special area within the table provides a convenient station access for children and handicapped persons. The fish cleaning station also includes a centrally located safety guard and a time controlled garbage disposal unit adapted with a back splash ring. The garbage disposal unit allows the fish cleaning waste to be easily disposed thereby helping to prevent the attraction of pests. The safety guard substantially prevents cleaning tools and the like from falling into the disposal unit.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 1 is a pictorial view of the fish cleaning station which is constructed in accordance with the present invention; and FIG. 2 is a side sectional view of the apparatus of FIG. 1.

BEST MODE FOR CARRYING OUT THE INVENTION

Referring now to the drawings, and more particularly to FIG. 1 thereof, there is shown a fish cleaning station 10, which is constructed in accordance with the present invention.

Considering now the inventive fish cleaning station 10 in greater detail with reference to FIGS. 1-2, the fish cleaning station 10 generally comprises a base 11 for supporting four side walls, such as wall 13, and a cleaning basin 15 for receiving fish waste products such as fish bones, fish heads, and fish waste. A cleaning table or counter top 14 surrounds the basin 15 for providing a user with an elevated stationary surface for dressing or cleaning a carcass (not shown) of waste materials. The cleaning basin 15 includes a floor 16 having an opening 17 disposed at its geometric center. The floor 15 slopes downwardly and away from the counter 14 at a slight inclined angle toward the opening 17 to help direct the flow of debris and water toward the opening 17. A waste disposal apparatus 18 is disposed directly beneath the opening 17 for receiving the waste products as the waste is washed and flushed down the cleaning basin 15 into the opening 17. A safety guard 23 is mounted to the floor 15 and covers the opening 17. The safety guard 23 substantially prevents cleaning tools and the like from accidentally falling into the disposal unit 18. The guard 23 also prevents the waste products from being dislodged or thrown from the waste disposal unit as it grinds and pulverizes the waste material. The cleaning table or counter 14 is mounted and secured to the base assembly 11 by any conventional mounting means such as mounting bolts (not shown). The cleaning station 10 also includes a water distribution system and a power distribution system for providing a source of water and power to the cleaning table 14 area and to the disposal apparatus 18.

Considering now the water system for the present invention in greater detail with reference to FIGS. 1 and 2, a common public water source is supplied to the station 10 through a water pipe 80. The water pipe 80 is connected to the common public water source at one end and to a check valve 38 at its opposite end. The check valve 38 is provided so that the water supply to the station may be easily and conveniently turned on and off for installation and repair service. The check valve 35 is also connected to pipe 37 that is interconnected with a T-shaped pipe 39 and an L-shaped pipe 72 that distributes water to the cleaning basin 15 area and the disposal unit 18 respectively.

Considering now the T-shaped pipe 39 and its associated distribution system in greater detail, the T-shaped pipe 39 is connected to a pair of main water distribution pipes 30A and 31A, respectively. The pipes 30A and 31A are connected respectively to L-shaped pipes 30 and 31 that are disposed on opposite sides of the cleaning table 14. The upright portion of each of the pipes 30 and 31 extend perpendicularly upwardly and through holes 56 and 58 that are disposed in countertops 51 and 53, respectively. The pipes 30 and 31 each terminating in a U-shaped extension pipe, 30A and 31A, respectively. Each U-shaped pipe, 30A and 31A depends downwardly toward the surface of the cleaning table 14. A pair of flexible steel braided hoses 32 and 33 are connected respectively to pipes 30A and 31A. The opposite end of the hoses 32 and 33 are connected respectively to carcass spray nozzle assemblies 34 and 35. With this configuration, little or no strain is placed on the hoses 32 and 33 that project downwardly from the pipes 30A and 31A. Moreover, this particular configuration situates the nozzle assemblies 34 and 35 adjacent the surface of cleaning table 14 so they are easily accessible to a person standing or sitting next to the cleaning station 10.

Considering now the nozzles assemblies 34 and 35 in greater detail, the assemblies 34 and 35 are similar to one another and only assembly 34 will now be described in greater detail. The nozzle assembly 34 includes a cone-shaped nozzle or housing unit 80 having an elongated cylindrical end that is adapted to be secured to the hose 32. A spring activated valve (not shown) is disposed within the nozzle 80 and is connected to an activator 81. The activator 81, when activated, enables water to pass from hose 32 into the nozzle 80 and sprayed so that the table 14, cleaning basin 15, and meat carcass (not shown) may be easily and conveniently cleaned.

Considering now the water distribution system for the disposal unit 18 in greater detail with reference to the L-shaped pipe 72, the L-shaped pipe 72 is connected to a solenoid value 62 that is electrically activated whenever power is applied to disposal unit 18. The solenoid value 62 is also connected to an L-shaped pipe 73 that terminates in a spray head 74 disposed within the interior of the disposal unit 18. Pipe 73 is further connected to pipe 75 which also terminates in a spray head 76 that is disposed opposite, and in a parallel spaced-apart manner, from the spray head 75. In this manner, whenever power is applied to activate the disposal unit 18, a source of water will be automatically provided to the interior of the disposal unit regardless of whether or not the station's user sprays water into the cleaning basin 15.

Considering now the base assembly 11 in greater detail with reference to FIGS. 1 and 2, the base assembly 11 generally comprises a frame 40 of rigid metallic composition. The frame 40 includes four support legs, such as legs 41, 42, and 43, and four support braces, such as braces 44 and 45. The braces are interconnected by conventional means to form a generally square frame that is rigidly secured to the support legs of the frame 40. The base of each leg includes a mounting plate (not shown) so the frame 40 may be rigidly secured to a concrete slab 46 by conventional anchor bolts and nuts (not shown). An access wall 12 that includes a hingedly mounted access door 19, as well as the three side walls, such as side wall 13 are rigidly secured to the frame 40. The walls of the fish cleaning station are of unitary structure and are composed of any suitable rigid material, such as thick wood siding. It should be understood that the access door 19 is provided with a locking mechanism (not shown) so that only authorized persons will have access to the interior 70 of the station 10.

Considering now the cleaning table 14 in greater detail with reference to FIG. 1, the cleaning table 14 is generally rectangular shaped, and has a unitary structure and rigid metallic composition, such as stainless steel. The cleaning table 14 includes a U-shaped counter portion comprised of three elongated coplanar top portions 51, 52, and 53, and a cutout portion 54 that interconnects top portions 51 and 53. Each of the top portions 51, 52 and 53 are adapted to be rigidly mounted to the support legs of the frame 40 by conventional mounting means. Top portions 51 and 52 have holes 56 and 58 that are adapted to receive the water pipes 30 and 31 respectively. As best seen in FIG. 1, pipe 31 and its associated hose 32 and spray nozzle assembly 34 are disposed immediately adjacent the cutout portion 34, so that a child or a handicapped person seated in a wheel chair can also easily reach the spray nozzle assembly 35.

Considering now the cutout portion 54 in greater detail with reference to FIGS. 1 and 2, the cutout portion 54 has a substantially less cross-sectional thickness than the U-shaped top portions 51, 52 and 53 to define a recessed surface 55 at a lower elevation relative to the top surfaces of the other counter portions 51, 52 and 53. The cutout portion 54 is also mounted to the frame 40 and extends perpendicularly away from the legs 42 and 43 so that it extends outwardly to a much greater extent than the overhangs of the other counter portions 51, 52 and 53. The lower surface 57 of the cutout portion 54 is in a spaced apart relationship to the concrete slab 46 so that a conventional wheelchair may be easily and conveniently rolled under the cutout portion 54. The cutout portion 54 terminates in a downwardly depending lip 71 that serves as a finger grip pole to enable a handicapped person seated in a wheelchair to easily and conveniently pull themselves and their chair up to the station 10. It should be understood that the recessed portion thus permits a handicapped person confined to a wheel chair to have access to the fish cleaning station 10 in such a manner that such handicapped person has easy and convenient access to the basin 15 and spray nozzle assembly 35.

Considering now the basin 15 in greater detail with reference to FIGS. 1 and 2, the floor 16 of the basin is comprised of four truncated triangle sections 90, 92, 94, and 96 that are joined together in a coplanar relation. The sections 90, 92, 94 and 96 form a downwardly sloping square shaped basin that terminates at its lower end in the opening 17 which is also generally square shaped.

As best seen in FIG. 2, a set of elongated spring hinges 91, 93, 95 and 97 are connected to the lower most edges of the triangular sections 90, 92, 94 and 96, respectively.

Considering now the safety guard 23 in greater detail with reference to FIGS. 1 and 2, the safety guard 23 is comprised of four triangular doors 24, 25, 26 and 27 that fit together in a coplanar configuration that forms a horizontal plane. Each respective door is hingedly mounted to the floor 16 of the basin 15 by a hinge spring such as springs 91 and 97 respectively. The tension executed by each respective spring holds its respective door in a horizontal plane so that knives and other cleaning apparatus that are accidentally dropped into the basin 15 will not slide down the basin 15 and fall into the waste disposal unit 18. However, the stiffness is not so strong, that each door may be easily and conveniently pressed down by a person using the station so that the doors will pivot downwardly to allow the waste to easily and conveniently fall into the mouth of the disposal unit 18. When a person releases the downward pressure, the depressed door returns to its normally closed position and serves as a guard to prevent the waste material from being dislodged back into the basin 15 during the disposal unit 18 grinding process. The guard 23 also serves as a safety device to help prevent a person from accidentally placing their hand into the disposal unit during its grinding operation.

Considering now the disposal unit 18 in greater detail with reference to FIG. 2, the disposal unit 18 is a conventional commercial unit, such as a 2 HP "IN-SINK-ERATOR" model SS-220, 115/208/230 volt, single phase, auto-reversing unit. The disposal unit 18 is mounted to the frame 40 of the station 10 by any convenient mounting means. The disposal unit 18 includes a cone shaped hollow throat 100 that is connected at one of its terminal end to a grinder 102 having a set of grinding blades (not shown). The blades of the grinder 102 are driven by a motor 104. The grinder 102 has an outlet 106 that is connected to a drain pipe 108 for receiving ground up waste products. In this manner, the ground up waste products may be washed down into the drain pipe 108 by water flowing under the force of gravity. The opposite end of the throat 100 terminates in a lip 101 that is mounted flush against the under surface 16A of the floor 16 to form a water tight seal between the floor surface 16A and lip 101 of the throat.

The disposal unit 18 also includes a splash guard screen 105 that is disposed in a slightly spaced apart manner beneath the spray heads 74 and 75, respectively. The screen 105 is generally circular having a centrally disposed opening 107. In this manner, as water is sprayed into the disposal unit 18 through the spray heads 74 and 75, the splash guard screen 105 substantially prevents waste material from being lodged against the spray heads 74 and 75 and generally confines the waste to the lower portion of the throat 100 and the grinder 102.

Considering now the power distribution system for the station 10, a common public electrical inlet (not shown) is disposed in the interior 70 of the station. A starter 61 is connected to the electrical power inlet by a conduit (not shown). The starter 61 is electrically connected to the motor by a conduit (not shown), and to the solenoid valve 62 by wire 109. An L-shaped conduit 63 is also connected to the starter 61 at one terminal end. The upright portion of the conduit 63 extends upwardly through a hole 58A disposed adjacent hole 58 in top 51. The conduit 63 terminates at its uppermost end in a switch assembly 65.

Considering now the switch assembly 65 in greater detail with reference to FIG. 2, the switch assembly 65 includes a housing unit 67, and a time-delay control switch having an activator button 66. The button switch 66 is disposed immediately adjacent the cutout portion 54 of the cleaning table 14 so that the button switch 66 may be easily and conveniently activated by any person, including a child or a handicapped person seated in a wheel-chair. It should be understood that the disposal unit 18 will automatically turn off by reason of the time-delay control switch 66.

To clean fish at the cleaning station 10 hereinbefore described, the cleaning station 10 is assembled at any convenient public recreational facility. The cleaning station disposal unit 18 is connected to the drain and the common pipe is connected to the water source.

Once the cleaning station 10 has been assembled and connected, a user may place a fish, for example, on the cleaning table 14 and dress the fish for eating purposes by cutting off its head, removing its scales, and removing its innards. Thereafter, the user may wash the dressed fish by utilizing a spray nozzle, such as nozzle 34 to clean any debris material from the fish carcass. After cleaning the fish carcass, the user may then wash down the cleaning counters 51, 52 and 53 and wash the fish waste products to the splash guard 23. The user then depresses the door or doors supporting the waste thereby causing the waste to fall under the force of gravity into the disposal unit 18. Once the waste has fallen into the disposal unit 18, the user activates the disposal by pressing the activation switch 66. As the disposal unit 18 grinds the waste product, the user may wash the splash guard 23 to assure the entire station 10 is clean and to help wash the fish waste down the drain.

While a particular embodiment of the present invention has been disclosed, it is to be understood that various different modifications are possible and are contemplated within the true spirit and scope of the appended claims. There is no intention, therefore, of limitations to the exact abstract or disclosure herein presented.

What is claimed is:

1. A meat cleaning station for connection to a sewage drain, electrical power source and water source comprising:
    base means having a frame and a plurality of walls for enclosing said frame;
    basin means for receiving meat waste products, said means including a floor having an opening therein for passing the meat waste products therethrough;
    counter means surrounding said basin means for providing a stationary surface adjacent said basin means for cleaning the meat;
    disposal means for grinding up meat waste products, said disposal means being disposed beneath said opening and connected to the water source, the electrical power source and the drain for receiving and discharging the meat waste products into the drain; and
    closure means mounted on said basin means for moving between an opened position toward said opening and a closed position sealing over said opening whereby meat waste products may be substantially contained within said disposal means when said closure means is disposed in a closed position and said disposal means grinds up said meat waste products for discharge into the drain.

2. A meat cleaning station as recited in claim 1, wherein said closure means comprises a plurality of doors hingedly mounted to said floor, said doors being spring biased in a closed position covering said opening.

3. A meat cleaning station as recited in claim 2. wherein said doors are triangularly shaped, equally dimensioned and forming a substantially sealed surface when said doors are disposed in a closed position.

4. A meat cleaning station as recited in claim 1, wherein said counter means comprises a plurality of horizontal cutting platforms forming a continuous cutting counter top surrounding said basis means; said cutting platforms being mounted on top of said base means and projecting outwardly and perpendicularly therefrom.

5. A meat cleaning station as recited in claim 1 wherein said counter means includes at least one cutting platform disposed in a horizontal plane that is parallel and substantially lower than the horizontal plane of the other platforms, whereby handicapped persons can readily use the lower platform.

6. A meat cleaning station as recited in claim 5 wherein said lower platform projects outwardly from said base means substantially further than the remaining portion of said counter means.

7. A meat cleaning station as described in claim 1, wherein said disposed means includes a splash guard screen for helping to prevent ground up meat waste products from being discharged upwardly through said opening.

8. A meat cleaning station as described in claim 1, wherein one of said walls includes:
    an opening therein defining an entrance for said base means; and
    said opening being covered with a door hingedly connected to said wall for providing a closure thereto.

9. A meat cleaning station for connection to a sewage drain, electrical power source and water source comprising:
    base means having a frame and a plurality of walls or enclosing said frame;
    basin means for receiving meat waste products, said means including a floor having an opening therein for passing the meat waste products therethrough;
    p1 counter means surrounding said basin means for providing a stationary surface adjacent said basin means for cleaning the mat;
    disposal means for grinding up meat waste products, said disposal means being disposed beneath said opening and connected to the water source, the electrical power source and the drain for receiving and discharging the meat waste products into the drain;
    means for actuating selectively a spray of water under pressure, said means being connected to the water source, and being disposed adjacent to said counter means; and
    means for actuating said disposal means for a predetermined period of time by the single actuation of said means, said means being connected to the electrical power source and being disposed adjacent to said counter means.

10. A meat cleaning station as described in claim 9, further including means for supplying water to the interior of said disposal means for a predetermined period of time when said means for actuating said disposal means is actuated.

* * * * *

UNITED STATES PATENT AND TRADEMARK OFFICE
CERTIFICATE OF CORRECTION

PATENT NO. : 4,935,991
DATED : June 26, 1990
INVENTOR(S) : Wayne Tourney

It is certified that error appears in the above-identified patent and that said Letters Patent is hereby corrected as shown below:

Column 7, line 57, delete "basis", and substitute --basin--.
Column 8, line 15, delete "disposed", and substitute --disposal--.
Column 8, line 29, delete "or", and substitute --for--.
Column 8, line 34, delete "p1".

Signed and Sealed this

Twenty-eighth Day of July, 1992

Attest:

DOUGLAS B. COMER

*Attesting Officer*       *Acting Commissioner of Patents and Trademarks*